ns patent office 3,004,980
Patented Oct. 17, 1961

3,004,980
THIOPHOSPHORIC ACID ESTERS
Gerhard Schrader, Opladen, Germany, assignor to Farbenfabriken Bayer Aktiengesellschaft, Leverkusen, Germany, a corporation of Germany
No Drawing. Filed Sept. 5, 1956, Ser. No. 607,995
Claims priority, application Germany Sept. 6, 1955
6 Claims. (Cl. 260—306)

This invention relates to certain new and useful thiophosphoric acid esters and methods for the general preparation of thiophosphoric acid esters of the following formula:

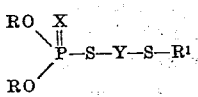

wherein R stands for alkyl radicals, $R^1$ may be an aliphatic radical and aromatic radical, the residue of a thiocarbonic acid or their derivatives, for instance, a thiophene radical, a monocyclic thiazole radical, a benzothiazole radical, and alkoxythiocarbonyl group and a thiocarbamyl group, X stands for O or S and Y is alkylene, particularly lower alkylene. This case is a continuation in part of our parent case, Serial No. 525,769.

The compounds of the above type are generally valuable pesticides. Analogous substances, wherein $R^1$ is an alkyl radical are used as insecticides in practice. Also various ways to obtain these alkyl compounds are known e.g. from the German Patent 830,509, wherein the reaction of salts of diesters of thiophosphoric acids with haloalkyl-mercaptans is described; another way to obtain these compounds is to react thiophosphoric- or phosphoric-acid halides with mercapto-alkyl mercaptans.

It is an object of the present invention to provide new and useful thiol- and thiono-thiol-phosphoric acid esters, particularly valuable in the field of insecticides.

Another object is to provide a general method for preparing the novel compounds of the invention and analogous compounds; still further objects will become apparent as the following description proceeds.

In accordance with the present invention it has now been found that thiol- and thiono-thiol-phosphoric acid etsers of the above formula and more specifically compounds of the formula

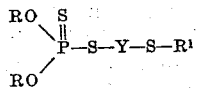

in which R stands for alkyl (especially lower alkyl) or phenyl radicals, Y is a lower alkylene, particularly an ethylene chain and $R^1$ is an aromatic (preferably phenyl) radical or the residue of a dithiocarbonic acid, may be obtained by reacting a β-halo-alkyl-thiol- or thiono-thiol-phosphoric acid ester with the corresponding mercaptan or dithiocarbonic acid derivative. This reaction takes place in accordance with the following general scheme:

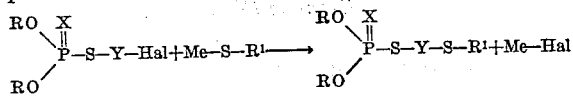

In those formulae R, X, Y and $R^1$ have the same significance as shown before, Hal means chlorine, bromine or iodine and Me stands for a metal or generally a salt forming anion.

The hitherto known thiophosphoric esters, e.g. those described in German Patent 830,509 (in which $R^1$ stands for e.g. an alkyl radical such as methyl, ethyl, propyl, butyl or other radicals) as well as the novel compounds of the invention may be obtained by this reaction. The fact that the halogen, especially the bromine atom, in β-position of a β-bromoethylthiol (or thiono-thiol-) phosphoric ester can be exchanged by this way, is very surprising, since the bromine standing in β-position of hydroxyl compounds (e.g. alcohols, phenols, and the like) cannot be exchanged under similar conditions.

The reaction generally may be carried out at temperatures from about 0° to about 150° C., more specifically between about 20° and 60° C. Generally the use of inert organic solvents such as liquid hydrocarbons, alcohols, ketones, ethers and the like is preferred, to accomplish the reaction. Examples of specific useful solvents are benzene, toluene, hexane, benzine, cyclohexane methanol, ethanol, acetone, methyl-ethyl-ketone, acetonitrile, etc. To react the halo-, especially the bromo-, alkyl esters with the appropriate mercaptans, the use of acid binding agents is advantageous. Thus the reaction may be carried out by reacting an alkali salt of a mercaptane with the halide compounds. It is not absolutely necessary, however, to start from salts of mercaptans. It is also possible to mix the mercaptans to be converted with e.g. the equivalent amount of an alkali metal alcoholate, such as the methylate or ethylate, and then to react this mixture at a slightly elevated temperature to obtain the desired S-alkyl-mercapto-alkyl-thiol (or thiono-thiol-) phosphoric acid ester.

Examples of especially suitable phosphoric ester reactants are the S-(bromoethyl-) O,O-dimethyl (or the corresponding -diethyl, -dipropyl, -dibutyl, -diamyl, -diphenyl-, dicyclo-hexyl or the mixed alkyl)-thiol- (or -thiono-thiol-) phosphoric esters. Instead of the S-bromoethyl ester, also the S-bromo-isopropyl, the S-bromo-(1,2-dimethyl-ethyl-) ester and the like may be used. In this case esters in which the S-ethyl group is further substituted by lower alkyl residues are obtained. The preparation of the bromo-esters is described in copending application Serial No. 605,959, now Patent No. 2,928,863 (Le A 3215) of Gerhard Schrader, filed concurrently herewith and entitled "Thiophosphoric Acid Esters and Their Production." Suitable aromatic mercaptans or derivatives of dithiocarbonic acids to form the new compounds are e.g. phenyl mercaptan, p-chloro-phenyl mercaptan, the tolyl mercaptan, the xylylmercaptans, 3,4-dichloro-phenylmercaptan, aromatic, heterocyclic mercaptans (such as 2-mercaptothiophene, 2-mercaptothiazole, 2-mercapto-benzo-thiazole etc.) dithio-carbonic acid esters such as the methyl-, ethyl-, propyl-, butyl-esters, etc., or dithiocarbonic acid amides such as the dimethyl-, diethyl-, dipropyl-, dibutyl-amide, the piperidide, the morpholide, etc. The thiophosphoric acid esters of the present invention are valuable insecticides which exhibit partly a systemic action with living plants. They may be used against a wide range of pests such as flies, mites, aphids, etc. Usually their application should be carried out in dilution or solution with solid or liquid carriers such as talc, chalk, bentonite, alcohol, water, hydrocarbons, etc. Concentrations from about 0.0001 to about 1% usually effectively kill the pests; lower or higher concentrations, however, can be used if desirable or necessary. The application may preferably be accomplished by dusting or spraying the active compounds or their compositions in the usual way for the application of phosphoric insecticides.

The following examples illustrate the present invention, without, however, restricting it thereto:

*Example 1*

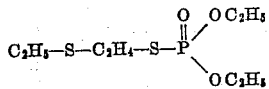

5 grams of powdered sodium are suspended in 250 ml. of dry ether. 30 grams of ethyl mercaptan are added thereto and the whole is stirred for several hours. The sodium salt of ethyl mercaptan is thus formed. To this suspension of the sodium salt there are added with stirring at 30° C. 56 grams of β-bromo-ethyl-thiol-phosphoric acid ethyl ester (B.P. 69 to 70° C. at 0.02 mm. Hg). The mixture is allowed to stand at 30 to 35° C. for 2 hours and 4 to 5 ml. of water are added to it in order to render the filtration of the salts thus formed more easy. The ether of the filtrate is evaporated. The residue is fractionated under vacuum. 40 grams of β-ethyl-mercapto-ethyl-thiol-phosphoric acid diethyl ester having a boiling point of 82° C. at 0.01 mm. Hg are obtained.

*Example II*

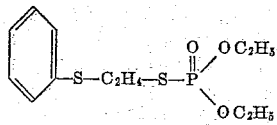

23 grams of phenyl mercaptan are mixed with 64 grams of an approximately 10 percent sodium ethylate solution. 56 grams of β-bromoethyl-thiol-phosphoric acid diethyl ester are added thereto at 35 to 40° C. and the temperature is maintained for a further hour. The reaction product is mixed with ether, shaken out with 70 ml. of water, dried, the ether is evaporated, and the residue fractionated. The β-phenylmercapto-ethyl-thiolphosphoric acid diethyl ester boils at 137° C. at 0.01 mm. Hg. 41 grams of the new ester are thus obtained.

*Example III*

The following esters may be obtained under similar conditions as described in Example II:

4 - methyl-phenyl-mercapto-ethyl-thiol-phosphoric acid diethyl ester, B.P. 148° C./0.1 mm. Hg;
4 - chloro-phenyl-mercapto-ethyl-thiol-phosphoric acid diethyl ester, B.P. 163° C./0.2 mm. Hg;
3,4-dichloro-phenyl-mercapto-ethyl-thiol-phosphoric acid di-ethyl ester, B.P. 171° C./0.2 mm. Hg.

*Example IV*

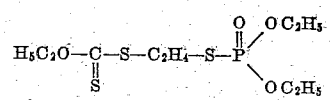

32 grams of potassium xanthogenate are suspended in 250 ml. of acetone. To this suspension there are added at 45° C. 56 grams of β-bromoethyl-thiol-phosphoric acid diethyl ester, and this temperature is maintained with stirring for about one hour. The whole crude product is then added to 400 ml. of water, and the water-soluble oil thus formed is separated and dried with sodium sulphate. 48 grams of the new mercapto ester are obtained. The ester thus formed boils at 140° C. at a pressure of 0.1 mm. Hg.

*Example V*

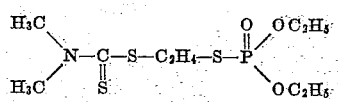

30 grams of dimethylamino-dithiocarbamic acid sodium salt are suspended in 300 ml. of acetone. 56 grams of β-bromoethyl-thiol-phosphoric acid ethyl ester are added thereto with stirring at 50 to 55° C. and the temperature is maintained for an hour. The sodium bromide thus formed is filtered off with suction and the solvent is removed from the filtrate by distillation. In this way 50 grams of the new mercapto phosphoric acid ester is obtained. The ester decomposes even in high vacuum on distillation. The new product is a pale yellow, barely water-soluble oil.

*Example VI*

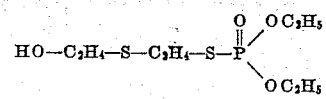

28 grams of β-hydroxyethyl mercaptan are dissolved in 64 grams of an approximately 10 percent sodium ethylate solution. To this solution are added with stirring at 30° C. 56 grams of β-bromoethyl-thiol-phosphoric acid ethyl ester. After a short time sodium bromide is separated with a clear heat effect. The aforesaid temperature is maintained for a further 15 minutes, the sodium bromide formed is then filtered off with suction, the alcohol is evaporated from the filtrate, and the residue is taken up with a little ether. The ethereal solution is washed with a little water, dried and fractionated. 33 grams of di-ethyl-thiol-β-hydroxy-ethyl-thioethyl-ester of B.P. 140° C./0.01 mm. Hg are obtained. The new ester is an almost odorless, pale yellow, barely water-soluble oil.

*Example VII*

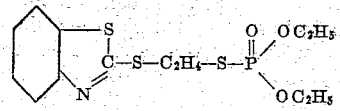

33.5 grams of 2-mercaptobenzo-thiazole are dissolved in 125 ml. of acetone and 64 grams of an approximately 10 percent sodium ethylate solution. To this solution are added with stirring at 50° C. 56 grams of β-bromoethyl-thiol-phosphoric acid diethyl ester dissolved in 75 ml. of acetone. The indicated temperature is maintained for about ½ hour, the solution is filtered with suction from the sodium bromide formed, and the solvent is distilled off from the filtrate. The residue is taken up in 100 ml. of chloroform, washed with a little water, dried and freed from the solvent in vacuo. 52 grams of the diethyl-phosphoric acid-β-2-mercapto-benzo-thiazyl-ethyl ester having a B.P. 190° C. at 0.05 mm. Hg are obtained. The new ester is a yellow, barely soluble oil.

*Example VIII*

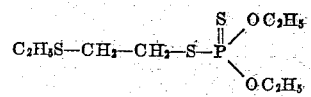

15 grams of ethyl mercaptan are dissolved in 15 cc. of ethanol. This solution is mixed with 100 cc. of ethanol, containing 0.2 mol of sodium ethylate, at 25° C. While stirring, there are added at 40° C. 60 grams of S-(β-bromoethyl)-thiono-thiol-phosphoric acid -O,O-diethyl ester, dissolved in 60 cc. of absolute ethanol. The reaction mixture has to react neutral after standing at 40° C. for a further hour. Then, the solution is cooled, filtered from precipitated sodium bromide and the ethanol is distilled off. The residue is taken up in ether three times. This solution is washed with water and then dried over sodium sulfate. After evaporating the ether the crude ester is distilled in vacuo. There are obtained 38 g. of the boiling point 90° at 0.01 mm. Hg.

*Example IX*

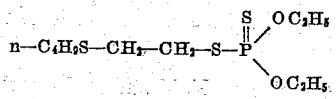

20 grams of n-butyl mercaptan are dissolved in 20 cc. of ethanol. This solution is combined with 100 cc. of 0.2 mol of sodium ethylate containing ethanol at 25°. As described in Example 1, 60 grams of S-(β-bromoethyl-) thiono-thiol-phosphoric acid diethyl ester in 60 cc. ethanol are added while stirring at 40° C. The reaction mixture should react neutral after one further hour of reaction at this temperature. The further recovering process may be carried out according to Example 1. There are obtained 39 g. of S-(n-butyl mercapto-ethyl)-0,0-diethyl-thiono-thiol-phosphoric acid of the boiling point 107° at 0.01 mm. Hg.

Example X

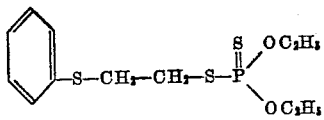

22 grams of thiophenol are dissolved in 22 cc. of ethanol and further added to a sodium ethoxide solution as described in either Example 1 or 2. 60 grams of S-($\beta$-bromo-ethyl-)-0,0-diethyl-thiono-thiol-phosphoric acid are added following the same procedure of Examples 1 or 2. After standing for one hour the reaction mixture reacts neutral. The reaction product, S-(phenyl mercapto-ethyl-)-0,0-diethyl-thionothiol-phosphoric acid, is isolated following the description of the previous examples. There are obtained 41 grams of the boiling point 128° at 0.02 mm. Hg. The ester is slightly colored and insoluble in water.

Example XI

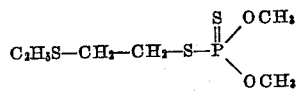

15 grams of ethyl mercaptan are dissolved in 15 cc. of methanol. This solution is mixed with 100 cc. of methanol, containing 0.2 mol of sodium methylate at 20° C. While stirring there are added slowly 55 grams of S-($\beta$-bromoethyl-) 0,0-dimethyl-thiono-thiol phosphoric acid, dissolved in 60 grams of methanol at a temperature of 35° C. After one further hour standing at this temperature the reaction mixture has to react neutral. After recovering the reaction product according to the description given in the previous examples there are obtained 20 grams of S-(ethylmercapto-ethyl-) 0,0-dimethyl-thiono-thiol phosphoric acid of the boiling point 78° at 0.01 mm. Hg.

I claim:
1. A compound of the general formula

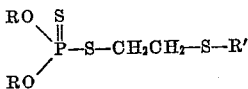

in which R stands for a lower alkyl radical and R' stands for a member selected from the group consisting of a thiophene radical, a monocyclic thiazole radical, a benzothiazole radical, an alkoxythiocarbonyl group and a thiocarbamyl group.
2. A compound of claim 1 wherein $R^1$ is a thiophene radical.
3. A compound of claim 1 wherein $R^1$ is a monocyclic thiazole radical.
4. A compound of claim 1 where $R^1$ is a benzothiazole radical.
5. A compound of claim 1 wherein $R^1$ is an alkoxythiocarbonyl group.
6. A compound of claim 1 wherein $R^1$ is a thiocarbamyl group.

References Cited in the file of this patent

UNITED STATES PATENTS

| | | |
|---|---|---|
| 2,565,920 | Hook et al. | Aug. 28, 1951 |
| 2,571,989 | Schrader | Oct. 16, 1951 |
| 2,597,534 | Schrader | May 20, 1952 |
| 2,793,224 | Fancher | May 21, 1957 |

FOREIGN PATENTS

| | | |
|---|---|---|
| 850,677 | Germany | Sept. 25, 1952 |
| 540,904 | Belgium | Sept. 15, 1955 |
| 542,600 | Belgium | Nov. 30, 1955 |
| 215,014 | Australia | July 26, 1956 |
| 947,369 | Germany | Aug. 16, 1956 |

OTHER REFERENCES

"Ritchter's Organic Chemistry," Vol. II, P. Blakiston's Sons & Co., Philadelphia, p. 210 (QD 251 R 54 E) (1922).

Richter: "Texbook of Organic Chemistry," John Wiley & Sons, Inc., New York (1938) p. 258.